United States Patent
Diamantopoulos et al.

(10) Patent No.: US 11,863,385 B2
(45) Date of Patent: Jan. 2, 2024

(54) OPTIMIZING CONTAINER EXECUTIONS WITH NETWORK-ATTACHED HARDWARE COMPONENTS OF A COMPOSABLE DISAGGREGATED INFRASTRUCTURE

(71) Applicant: International Business Machines Corporation, Armonk, NY (US)

(72) Inventors: Dionysios Diamantopoulos, Thalwil (CH); Burkhard Ringlein, Bülach (CH); Francois Abel, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 17/648,573

(22) Filed: Jan. 21, 2022

(65) Prior Publication Data
US 2023/0239209 A1 Jul. 27, 2023

(51) Int. Cl.
*H04L 41/082* (2022.01)
*H04L 47/12* (2022.01)

(52) U.S. Cl.
CPC ............ *H04L 41/082* (2013.01); *H04L 47/12* (2013.01)

(58) Field of Classification Search
CPC .............................. H04L 41/082; H04L 47/12
See application file for complete search history.

(56) References Cited

U.S. PATENT DOCUMENTS

| | | |
|---|---|---|
| 7,363,260 B1 | 4/2008 | Stamler et al. |
| 7,584,345 B2 | 9/2009 | Doering |

(Continued)

FOREIGN PATENT DOCUMENTS

WO 2016168033 A1 10/2016

OTHER PUBLICATIONS

"Compute, Storage, and Networking Extensions", Downloaded Jan. 5, 2022, 10 Pgs. <https://kubernetes.io/docs/concepts/extend-kubernetes/compute-storage-net/device-plugins/>.

(Continued)

*Primary Examiner* — Mohamed A. Wasel
*Assistant Examiner* — Kidest Mendaye
(74) *Attorney, Agent, or Firm* — Michael A. Petrocelli

(57) ABSTRACT

The invention is notably directed to a method, computer program product, and computer system for running software inside containers. The method relies on a computerized system that includes a composable disaggregated infrastructure, in addition to general-purpose hardware. The computerized system is configured to dynamically allocate computerized resources, which include both general resources and specialized resources. The former are enabled by the general-purpose hardware, while the latter are enabled by specialized network-attached hardware components of the composable disaggregated infrastructure. The method maintains a table capturing specializations of the specialized network-attached hardware components. At runtime, software is run inside each container by executing corresponding functions. A first subset of the functions are executed using the general resources, whereas a second subset of the functions are executed using the specialized resources, by offloading the second subset of functions to respective components of the specialized network-attached hardware components, in accordance with the specializations.

19 Claims, 8 Drawing Sheets

(56) References Cited

U.S. PATENT DOCUMENTS

| | | | |
|---|---|---|---|
| 7,941,777 | B1 | 5/2011 | Young et al. |
| 10,171,169 | B2 | 1/2019 | Frankel |
| 10,275,558 | B2 | 4/2019 | Tamir |
| 10,833,955 | B2* | 11/2020 | Isci .................... H04L 41/0895 |
| 11,360,789 | B2 | 6/2022 | Ringlein |
| 2002/0141449 | A1 | 10/2002 | Johnson |
| 2006/0242649 | A1 | 10/2006 | Gurevich |
| 2007/0153681 | A1 | 7/2007 | Steeb |
| 2007/0156549 | A1 | 7/2007 | Tran |
| 2015/0193233 | A1 | 7/2015 | Eberle et al. |
| 2016/0202999 | A1 | 7/2016 | Van Den Heuvel |
| 2017/0123394 | A1 | 5/2017 | Oliverio et al. |
| 2018/0129770 | A1* | 5/2018 | Tamir .................. G06F 13/1673 |
| 2019/0155669 | A1 | 5/2019 | Chiou |
| 2019/0187718 | A1 | 6/2019 | Zou |
| 2019/0190847 | A1 | 6/2019 | Burger |
| 2020/0257566 | A1* | 8/2020 | Ganguli .............. G06F 15/7807 |
| 2021/0081432 | A1* | 3/2021 | Grunwald ............. G06F 16/273 |
| 2021/0182052 | A1 | 6/2021 | Li |
| 2021/0303352 | A1 | 9/2021 | Diamantopoulos et al. |
| 2021/0399954 | A1* | 12/2021 | Dabell .................. G06F 9/5077 |

OTHER PUBLICATIONS

Amazon Web Services To Launch Its Own Public Container Registry, Downloaded Jan. 5, 2022, 2 Pgs. <https://www.techzine.eu/news/devops/51682/amazon-web-services-to-launch-its own-public-container-registry/>.

Ringlein et al., "Configuration of Hardware Devices", U.S. Appl. No. 16/921,539, filed Jul. 6, 2020, 33 pages.

Diamantopoulos et al., "Messaging for a Hardware Acceleration System", U.S. Appl. No. 16/833,755, filed Mar. 30, 2020, 24 pages.

IBM Appendix P., "List of IBM Patents or Patent Applications to be Treated as Related", Dated Herewith, 2 pages.

Jones; "Reducing Your Docker Image Size", Downloaded May 6, 2021, 6 Pgs., <https://www.cloudbees.com/blog/reduce-docket-image-size/>.

Roozbeh et al.;, "Software-Defined "Hardware" Infrastructures: A Survey on Enabling Technologies and Open Research Directions", 2018, 34 Pgs, <https://doi.org/10.1109/COMST.2018.2834731>.

Shantharama et al;, "Hardware Acceleration for Container Migration on Resource-Constrained Platforms", IEEE Access, Sep. 18, 2020, vol. 8, 2020, 16 Pgs, <https://creativecommons.org/licenses/by4.0/>.

Understanding Disaggregated Compute and Storage for Kubernetes, Oct. 5, 2020, 9 Pgs, <https://portworx.com/understanding-disaggregated-compute-and-storage-for-kubernetes/>.

Weerasinghe; "Standalone Disaggregated Reconfigurable Computing Platforms in Cloud Data Centers", Technische Universität Munchen, May 2018, 182 Pgs.

Github, "AWS Shell Interface Specification," https://github.com/aws/aws-fpga/blob/master/hdk/docs/AWS_Shell_Interface_Specification.md#ShellInterfaces, printed May 7, 2020, 21 pgs.

Github, "IBM CAPI SNAP framework, Version 1.0, How is data managed in the SNAP environment?," https://github.com/open-power/snap/blob/master/doc/AN_CAPI_SNAP-How_is_data_managed.pdf, printed May 7, 2020, 3 pgs.

Mell et al., "The NIST Definition of Cloud Computing," Recommendations of the National Institute of Standards and Technology, U.S. Department of Commerce, Special Publication 800-145, Sep. 2011, 7 pgs.

Putnam, et al., "A Reconfigurable Fabric for Accelerating Large-Scale Datacenter Services," https://www.microsoft.com/en-us/research/wp-content/uploads/2016/02/Catapult_ISCA_2014.pdf,@2014 IEEE, 12 pgs.

Ringlein et al., "System architecture for network-attached FPGAs in the Cloud using partial reconfiguration," IEEE: DOI 10.1109/FPL.2019.00054, @2019 IEEE, 8 pgs.

Tarafdar et al., "Building the Infrastructure for Deploying FPGAs in the Cloud," https://www.researchgate.net/publication/327162335, Jan. 2019, 27 pgs.

Unknown, "Express routing," https://expressjs.com/en/guide/routing.html, printed May 7, 2020, 6 pgs.

Xilinix, "Data Center Acceleration," https://www.xilinx.com/applications/data-center.html, printed May 7, 2020, 6 pgs.

Canziani et al., "An Analysis of Deep Neural Network Models for Practical Applications", Apr. 14, 2017, 7 pages.

Sze et al., "Efficient Processing of Deep Neural Networks: A Tutorial and Survey", Aug. 13, 2017, 32 pages.

Diamantopoulos et al., "A System-level Transprevcision FPGS Accelerator for BLSTM with On-Chip Memory Reshaping", 2018 International Conference on Field-Programmable Technology (FPT), Dec. 10-14, 2018, 4 pages.

Xu et al., "Scaling for edge inference of deep neural networks", nature electronics, Apr. 2018, 8 pages.

Zhang et al., "HGum: Messaging Framework for Hardware Accelerators", Jan. 19, 2018, 8 pages.

Samragh et al., "CodeX: Bit-Flexible Encoding for Streaming-based FPGA Acceleration of DNNs", Jan. 17, 2019, 9 pages.

Koeplinger et al., "Spatial: A Language and Compiler for Application Accelerators", PLDI'18, Jun. 18-22, 2018, 16 pages.

* cited by examiner ate with a cloud platform for running
OPTIMIZING CONTAINER EXECUTIONS WITH NETWORK-ATTACHED HARDWARE COMPONENTS OF A COMPOSABLE DISAGGREGATED INFRASTRUCTURE

BACKGROUND

The invention relates in general to the field of computer-implemented methods, systems, and computer program products for running software inside containers. In particular, the invention is directed to methods for optimizing the execution of containers by offloading the execution of certain functions to network-attached hardware components of a composable disaggregated infrastructure.

Containerization concerns the packaging of software code with just the operating system libraries and dependencies required to run the code, with a view to creating a single lightweight executable—called a container—that runs consistently on any infrastructure. I.e., containerization allows applications to be "written once and run anywhere." This portability speeds up development and prevents cloud vendor lock-in. Other notable benefits are fault isolation, ease of management, and simplified security. That is, containerization allows developers to create and deploy applications faster and more securely. More portable and resource-efficient than virtual machines, containers have become the de facto compute units of modern cloud-native applications.

The application container market is expected to grow substantially in the years to come. Currently, the market is moderately fragmented but highly competitive, hence a need to speed-up the containerization technology, including the container's build time and response time.

SUMMARY

According to a first aspect, the present invention is embodied as a method of running software inside containers. The method relies on a computerized system that includes a composable disaggregated infrastructure, in addition to general-purpose hardware. The computerized system is configured to dynamically allocate computerized resources, which include both general resources and specialized resources. The former are enabled by the general-purpose hardware, while the latter are enabled by specialized network-attached hardware components of the composable disaggregated infrastructure. The method maintains a table capturing specializations of the specialized network-attached hardware components. At runtime, software is run inside each container by executing corresponding functions. A first subset of the functions are executed using the general resources, whereas a second subset of the functions are executed using the specialized resources, by offloading the second subset of functions to respective components of the specialized network-attached hardware components, in accordance with the specializations.

According to another aspect, the invention is embodied as a computerized system for running software inside containers. The system comprises general-purpose hardware and a composable disaggregated infrastructure with specialized network-attached hardware components. The system is configured to dynamically allocate computerized resources, i.e., general resources enabled by the general-purpose hardware, as well as specialized resources enabled by the specialized network-attached hardware components. Consistently with the above method, the system is further configured to run software inside each container, by executing corresponding functions. In operation, a first subset of functions are executed using the general resources, whereas a second subset of functions are executed using the specialized resources, by offloading the second subset of functions to respective components of the specialized network-attached hardware components, in accordance with specializations of such components. To that aim, the system maintains a table capturing the specializations of the network-attached components.

According to a final aspect, the invention is embodied as a computer program product, which embodies a system software of a computerized system such as described above. The computer program product includes a computer readable storage medium having program instructions embodied therewith. The program instructions are executable by processing means of the computerized system to cause the system software to perform all the steps of the above method.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings:

FIG. 3 further illustrates the ability of the system to identify library dependencies, with a view to offloading the identify libraries to specialized network-attached hardware components, as in embodiments;

The accompanying drawings show simplified representations of devices or parts thereof, as involved in embodiments. Similar or functionally similar elements in the figures have been allocated the same numeral references, unless otherwise indicated. Computerized systems, methods, and computer program products embodying the present invention will now be described, by way of non-limiting examples.

DETAILED DESCRIPTION OF EMBODIMENTS OF THE INVENTION

The following description is structured as follows. General embodiments and high-level variants are described in section 1. Section 2 addresses more specific embodiments and section 3 concerns technical implementation details. Note, the present method and its variants are collectively referred to as the "present methods". All references Sn refer to methods steps of the flowcharts of FIGS. 2, 4, 5, and 6, while numeral references pertain to devices, components, and concepts used in the present invention.

Section 1. General embodiments and high-level variants

Figure 1A:
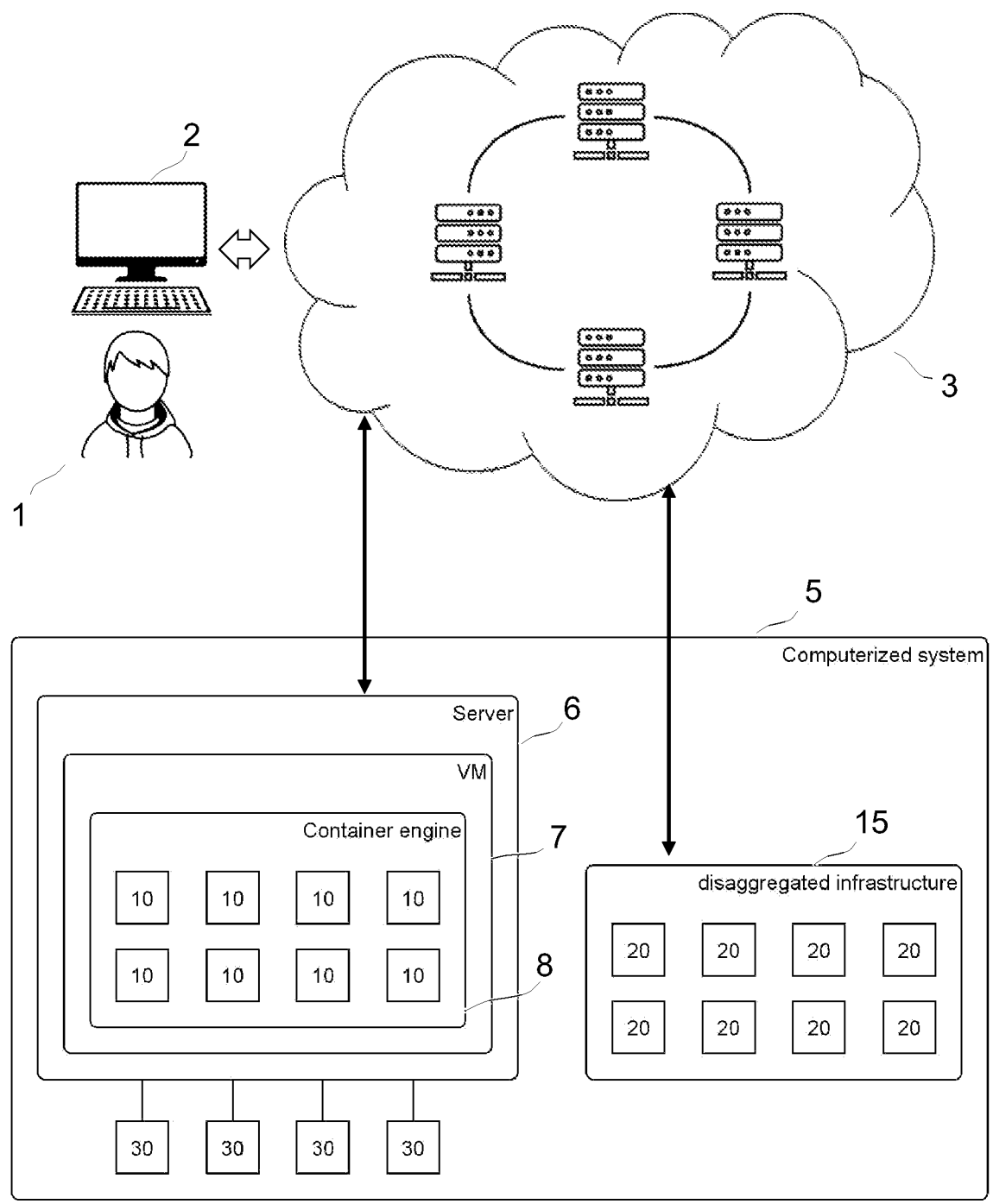
FIG. 1A is a diagram representing a user interacting with a computerized system via a cloud platform for running software inside containers. The computerized system includes a composable disaggregated infrastructure. The system is designed to dynamically allocate computerized resources, i.e., general resources enabled by general-purpose hardware, as well as specialized resources enabled by specialized network-attached hardware components of the composable disaggregated infrastructure, as in embodiments of the invention.
Figure 1B:
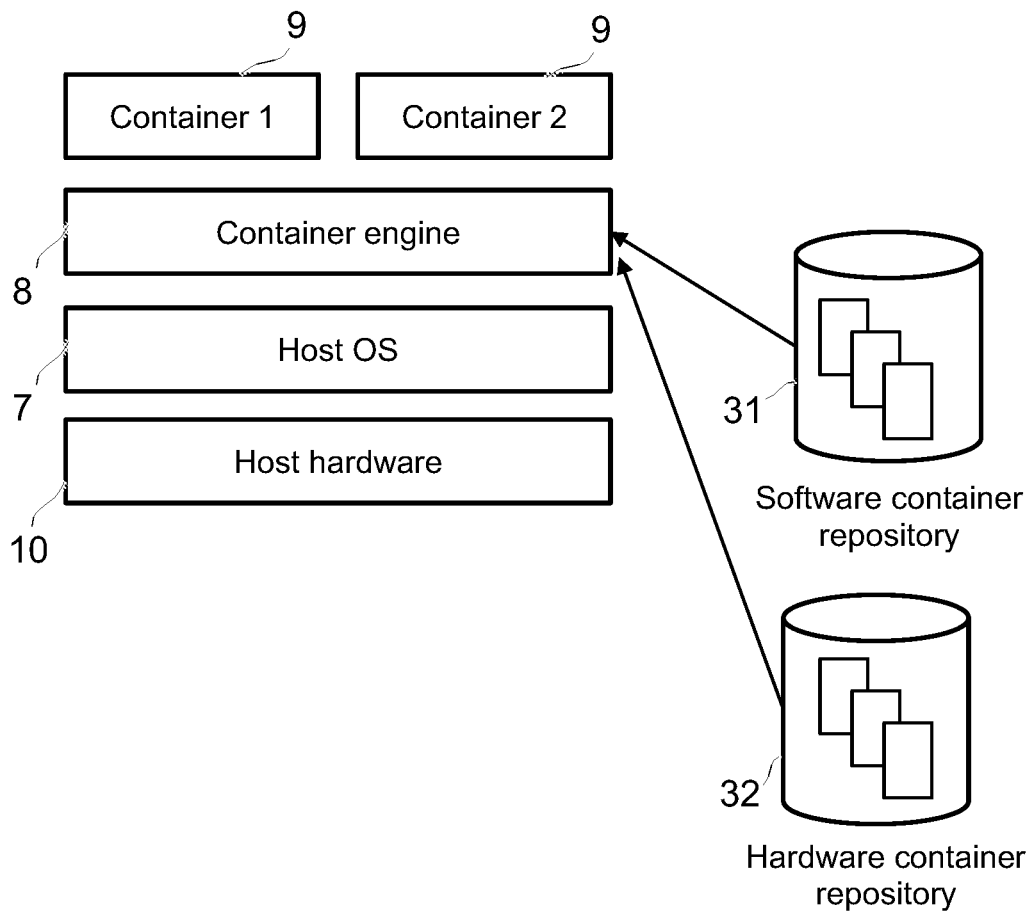
FIG. 1B is a diagram illustrating containers executing thanks to a container engine accessing data from both a software repository and a hardware repository, as in embodiments.
Figure 2:
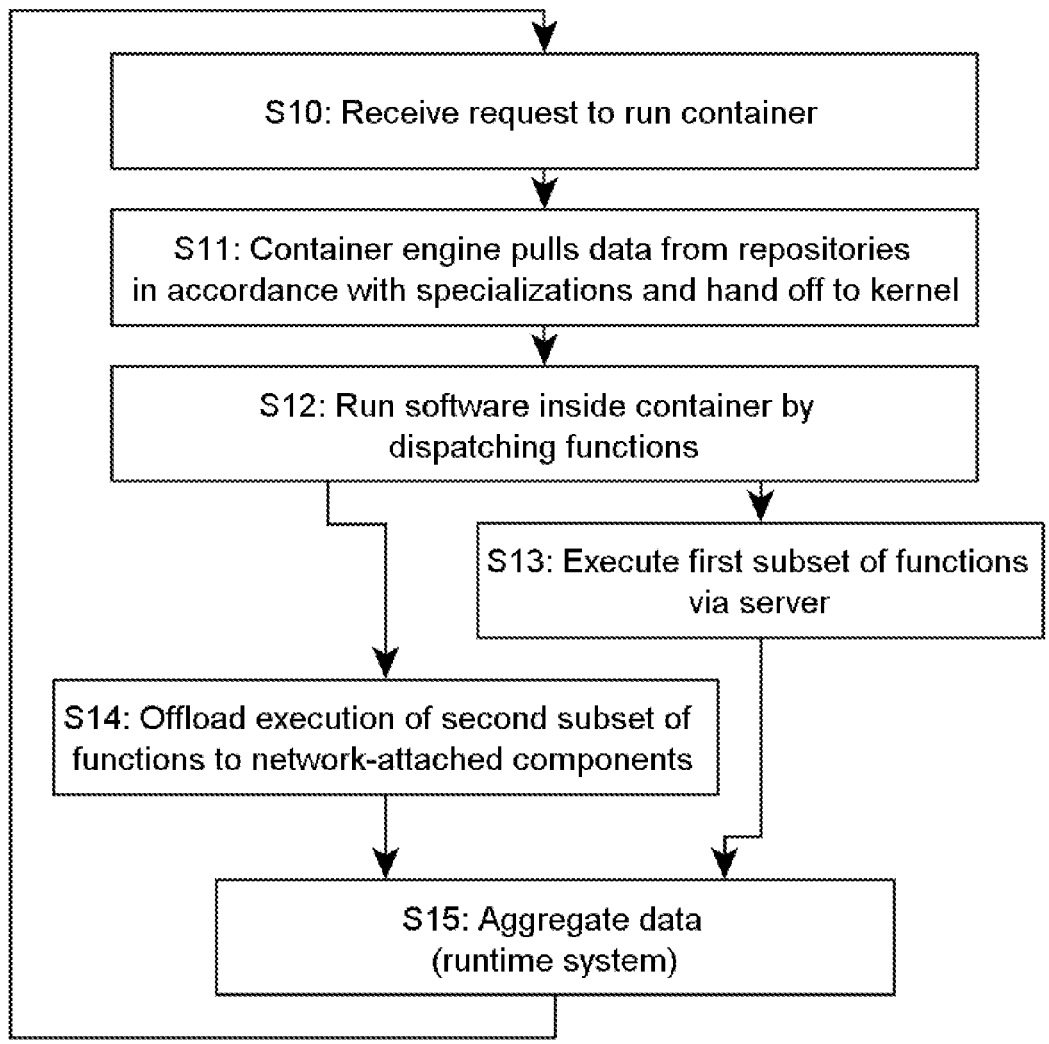
FIG. 2 is a flowchart illustrating high-level steps of a method of running software inside containers, according to embodiments.

In reference to FIGS. 1A, 1B, and 2, a first aspect of the invention is now described, which concerns a method of running software inside containers.

The method relies on a computerized system 5 such as depicted in FIG. 1A. In this example, the system 5 is assumed to be in data communication with a cloud computing system 3. A user 1 is assumed to be able to communicate with the system 5 via a user device 2 and the cloud 3. In variants, the system 5 may simply form part of the cloud 3. In all cases, the method is performed by computerized entities, which include entities 10, 20, 30 of the system 5 itself and may further involve other entities (e.g., from the cloud 3 and the user) interacting with the system 5. The method may also be partly implemented at nodes of a cloud platform 3.

The system 5 includes general-purpose hardware 10, 30, such as processors of central processing units (CPUs), graphics processing unit (GPU), and other electronic circuits, which typically forms part of a server 6. Interestingly, the system 5 is further equipped with a composable disaggregated infrastructure 15, which includes specialized, network-attached hardware components 20 (or NHCs for short). The NHCs 20 typically include hardware accelerators, such as field-programmable gate arrays (FPGAs) and application-specific integrated circuits (ASICs). The components 20 may notably be specifically designed or configured to execute given libraries, as discussed later in detail.

Broadly speaking, the computerized system 5 is configured to dynamically allocate computerized resources, e.g., via the cloud 3. Such resources can be decomposed into general resources and specialized resources. The general resources are enabled by the general-purpose hardware 10, 30, while the specialized resources are enabled by the NHCs 20 of the composable disaggregated infrastructure 15. The general resources may notably include compute resources involving general-purpose processing units, memory resources, and storage resources, whereas the specialized resources involve specialized NHCs 20, which are attached to the infrastructure 15 and can be reached via a network, i.e., thanks to a network protocol, using network interface means. The system 5 actually concerns another aspect of the invention, which is discussed later.

According to the proposed method, certain tasks required for the containers 9 to execute at the system 5 are offloaded to the NHCs 20 of the composable disaggregated infrastructure 15. Running S12 software inside a given container requires executing S13, S14 functions corresponding to this software and this container. Now, according to the proposed approach, some of these functions (say a first subset of these) are executed S13 using the general resources enabled by the general-purpose hardware 10, 30, whereas other functions (i.e., a second subset of the required functions) are executed S14 using the specialized resources, as enabled by the NHCs 20.

This is achieved by offloading S14 the second subset of functions to respective components 20 of the NHCs 20, in accordance S25, S26 with specializations of the NHCs 20. To that aim, the proposed method maintains a table 30 (i.e., a registry or a lookup table, called "specialization array" in FIGS. 4-6), which captures the specializations of the NHCs 20. The method needs to keep track of such specializations, in order to be able to suitably offload the execution of functions to the NHCs 20. Note, the table 30 is not necessarily involved explicitly at runtime, for reasons that will become apparent later. Still, the specialized functions are offloaded S14 (at runtime) in accordance with the specializations as captured in this table 30.

The proposed solution leverages a disaggregated computing system 5 involving a composable disaggregated infrastructure 15, which can be flexibly reconfigured, whereby NHCs 20 can be added, reconfigured or, more generally, updated S235, to meet the needs of container users 1, as in embodiments. Note, in practice, the NHCs 20 can be provisioned either independently of the provisioning of the rest of the infrastructure of the system 5 (as assumed in FIG. 1A) or using a same infrastructure.

Using NHCs 20 makes the execution of the containers 9 and the software executing inside the containers more efficient, because some of the functions required for this execution are offloaded to hardware that is specialized, i.e., specifically configured for executing such functions. Moreover, the proposed architecture allows the built time, response time, and memory footprint of the containers 9 to be substantially decreased, as some of the container workload can be directly offloaded to specialized hardware 20, thereby bypassing the technical debt of usual servers 6. The technical debt refers to the computational costs incurred by various layers going from hardware level up to the application level, including, the operating system, the virtualization, the drivers, etc.

In addition, offloading software functions to the NHCs 20 makes it possible to shrink the container's image size, while increasing the number of containers 9 per bare-metal servers 6, decreasing the execution time of the containers (application acceleration). In an embodiment, the offloading can be done seamlessly, e.g., using network sockets. Moreover, the NHCs 20 can easily be integrated next to usual container platforms and simple procedures are proposed herein to build and deploy containers leveraging such NHCs 20.

The specialization table 30 may possibly form part of a "hardware repository" 32 (FIG. 1B). The latter is similar in purpose to a software repository 31 (also known as "container repository") that is used to build container software. However, the hardware repository 32 is here meant to contain or provide access to all data (including programming code and configuration parameters) necessary to run the NHCs 20. For instance, the hardware repository 32 may include bitfiles for FPGAs, as well as metadata. In addition, the repository 32 may store the specialization table 30.

The control data that are necessary to offload the execution of specialized functions can be included in (or indirectly implied by) the container image. In operation, inputs and outputs (I/O) use network interface connections means to suitably reach the NHCs 20. Note, the network interface and connection data needed to connect to the NHCs 20 can be stored in the hardware repository 32 too.

The offloading operations S14 can be managed statically or dynamically, depending on the network protocols, network interfaces, and connection means relied upon. For example, the method may use mechanisms involving pure network sockets, Remote Direct Memory Access (RDMA), Representational state transfer (Rest) API, Remote Procedure Calls (RPC), stream processing/message brokers (e.g., Apache Kafka, Apache Flink, Apache Samza, Apache Spark, RabbitMQ), etc. Various RPC implementations can be contemplated, such as the so-called gRPC, Protocol Buffers, Apache Thrift, Apache Avro, JSON-RPC, and XML-RPC. More generally, various protocols and interfaces exist, which allow to connect to the relevant NHCs 20 at runtime.

A particularly practical approach is for the interface logic to rely on network sockets, which allow to seamlessly reach the NHCs 20. Note, such interface logic does not explicitly involve the table 30. However, it is designed and built in accordance with specializations as tracked in this table, so as to make it possible to reach the relevant NHCs. In variants, a mechanism similar to a domain name system can be used, to suitably reach the NHCs 20. The control paths and data paths are typically managed by the runtime system on execution of the containers 9. Note, the containers and software executing inside the containers 9 may possibly be orchestrated.

As evoked above, a static addressing mechanism can be used to address the NHCs 20 at runtime, especially for what concerns the usual, highly repetitive tasks. However, a dynamic addressing mechanism can be advantageous when reconfigurations of the NHCs 20 are needed. This way, it will not be necessary to generate new container images that consistently reflect the latest NHC configurations. As said, a dynamic addressing mechanism can for instance be handled using a DNS-like mechanism or any dynamic address management protocol.

As per the present approach, executing software inside the containers 9 causes to perform certain functions on the conventional hardware (e.g., the servers' CPUs 10) and to offload the execution of other functions to the NHCs 20. The functions performed on the conventional (server) hardware 10 are typically the most basic functions, while most specialized (typically work intensive) tasks end up on the NHCs 20. To that aim, containers "talk" to the NHCs 20 over a network. I.e., as noted earlier, inputs and outputs use network interface connections means. The application software, however, is typically agnostic to such connection means.

In general, the system 5 may include one or more servers 6, where such servers are configured to provide general resources. Similarly, the system 5 may include one or more composable disaggregated infrastructures 15. In the example of FIG. 1A, the system 5 includes a single server 6 and a single disaggregated infrastructure 15, for simplicity. The computerized system 5 is further assumed to be reachable via a cloud computing system 3, such that users 1 can request to deploy and run containers 9 as part of a cloud service. Note, the specialized functions may be directly offloaded S14 to respective NHCs 20 via the cloud computing system 3 at runtime, so as to bypass the server(s) 6.

As noted earlier, the NHCs 20 may possibly have to be reconfigured (to specialize the NHCs in performing specific tasks) and/or new NHCs 20 may be added in the infrastructure 15, as necessary to meet user needs. More generally, one or more of the NHCs 20 may have to be updated S235 to change their specializations, see FIG. 5. Note, such updates can happen any time, i.e., before, during, or after execution of a container. The table 30 must be consistently maintained S236, i.e., updated S236 according to the changed or added specializations of the devices 20.

In practice, NHCs 20 may have to be continually updated S235 based on the functionalities desired for the containers, which evolve over time. Such functionalities are defined in container files 40 (such as the so-called Docker files) provided by users 1 willing to deploy their containers. A container file 40 is typically a text document that contains all the commands a user could call on the command line to assemble an image.

Figure 3:
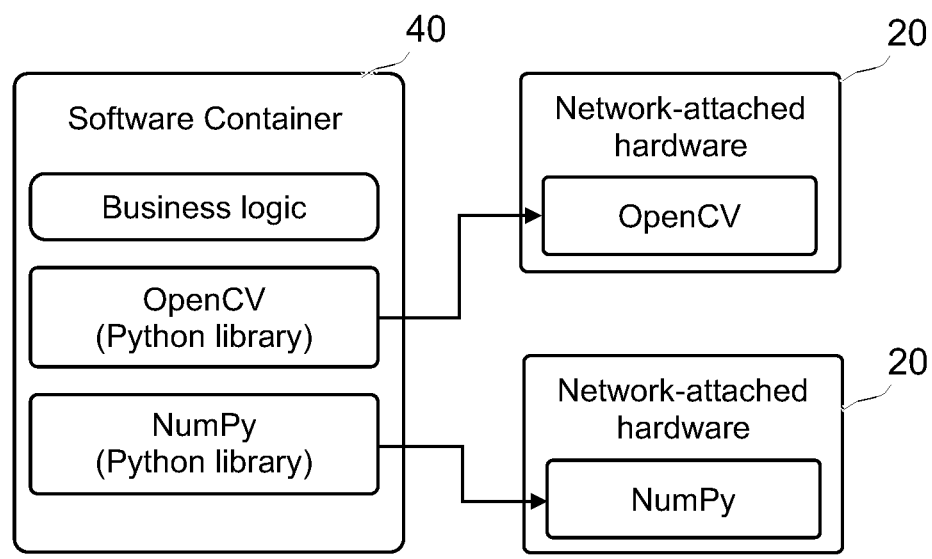
FIG. 3 schematically depicts a container file provided by a user willing to deploy a container, where the container file defines functionalities of the container.
Figure 4:
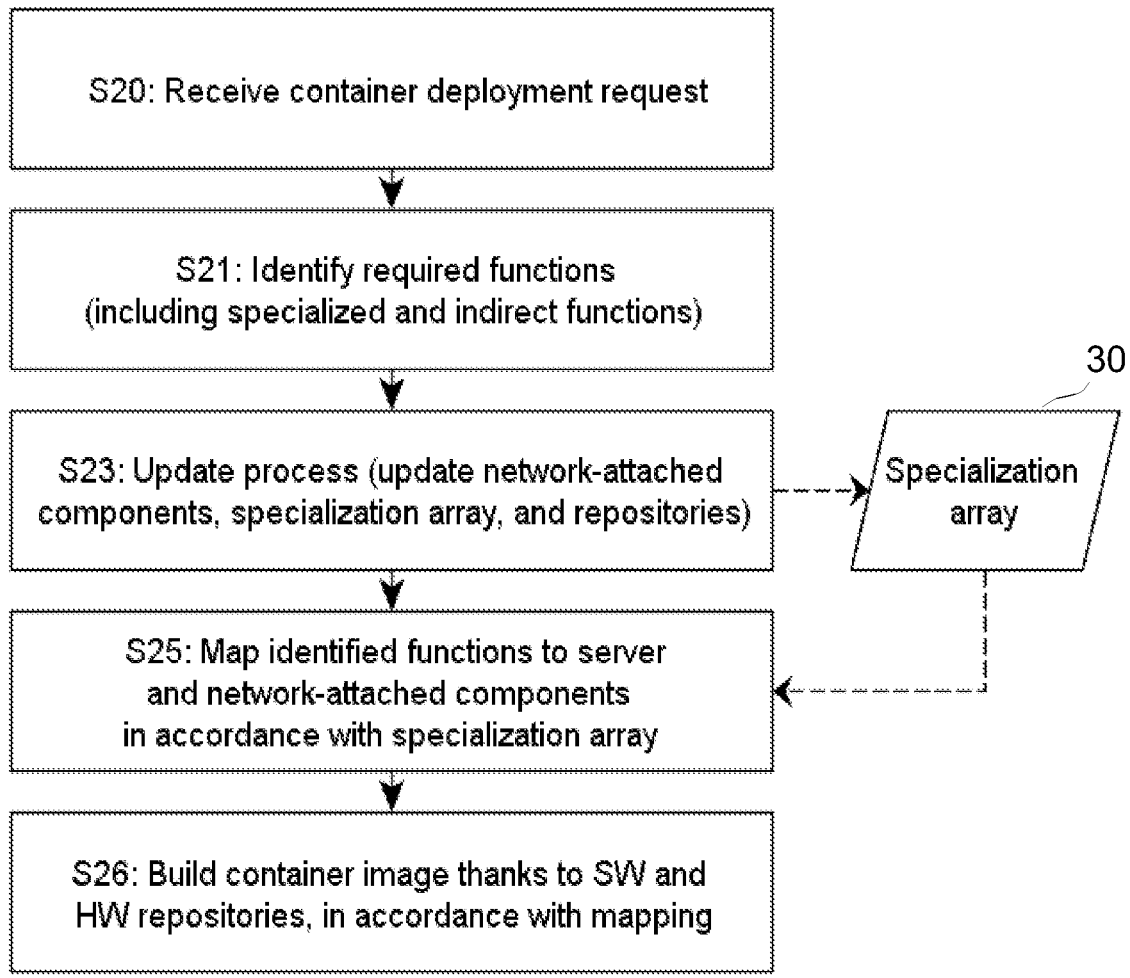
FIG. 4 is a flowchart illustrating high-level steps performed by the system to handle container deployment requests, as in embodiments.
Figure 5:
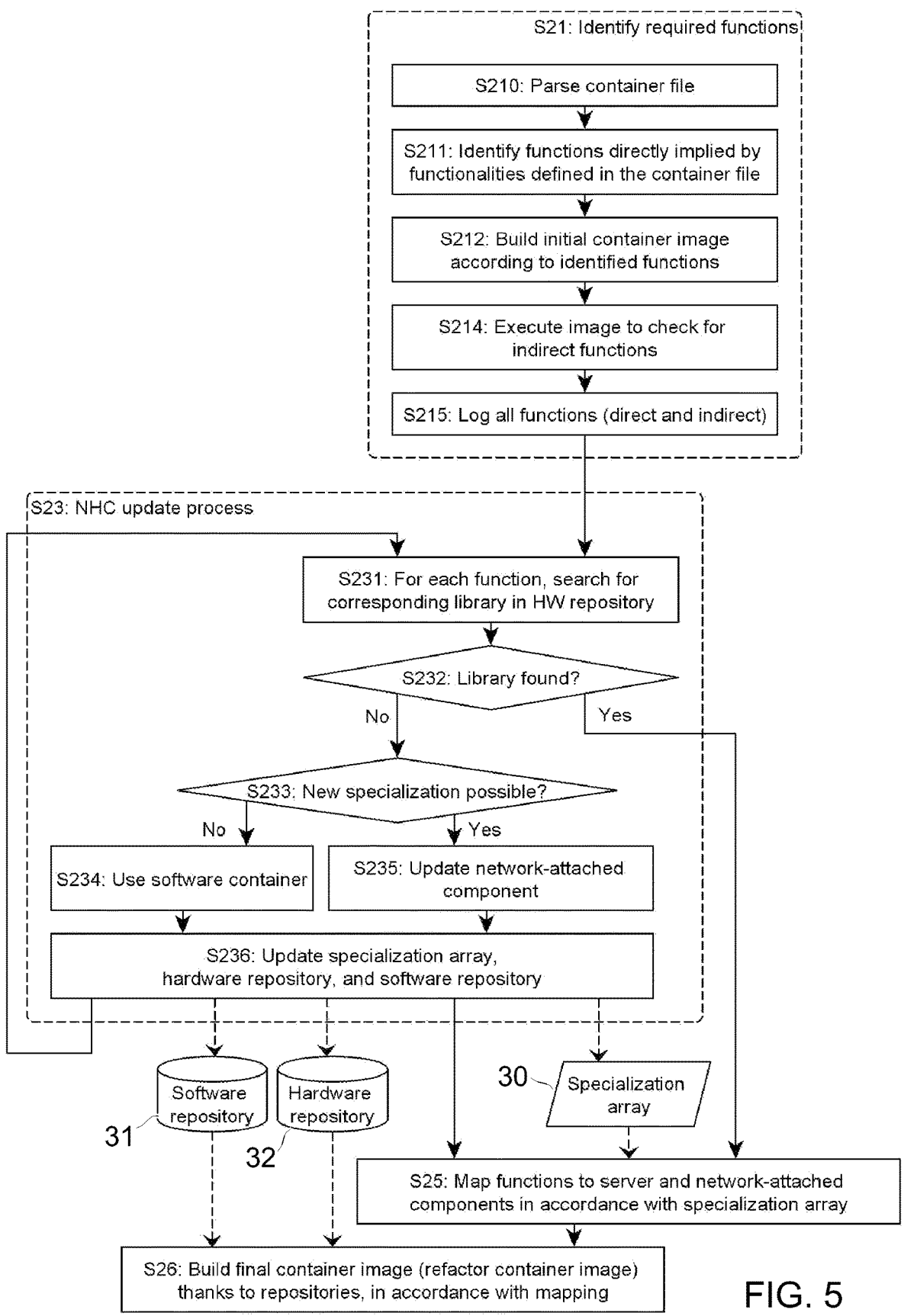
FIG. 5 is a flowchart showing detailed steps of the flow of FIG. 4.

As illustrated in FIGS. 3, 4, and 5, when a user 1 wants to deploy a container, the user provides a container file 40. The file 40 is accessed and parsed to identify S21 those functions that are implied by the functionalities defined in the container file. Based on all the identified functions, it is then possible to identify those functions (i.e., the second subset of functions) to be offloaded to the NHCs 20, according to the specializations captured in the table 30. The identified functions are then mapped S25 onto the computerized resources (be they the general or specialized resources). This way, associations are obtained, which reflects this mapping. In particular, the second subset of functions are mapped onto respective components 20 in accordance with respective specializations as captured in the table 30. Eventually, an image of the container 9 is built according to the associations obtained, with a view to obtaining a corresponding executable, i.e., the container itself. Thus, software can be subsequently run S12 inside this container, based on the image built.

Note, the terminology "container" refers to an executable program, executed at runtime, while a "container image" is a set of files used at build time to obtain the executable container. When at rest, the container image consists of one or more files stored in some suitable location, e.g., in a file format used to package software components and dependencies of a containerized software package. Examples of such container image formats are the Docker container images (Docker), Appc, LXD, and Open Container Initiative (OCI). When a user types a command to start a container, the container engine unpacks the required files and metadata, then hands them off to the Linux kernel. In the present case, the container engine may advantageously pull all the required data from distinct repositories 31, 32, as discussed later in detail.

It may not always be possible to directly identify all the required functions (step S21 in FIG. 4), because some functions are only implicit, i.e., they are implied by other functions. Thus, one may distinguish direct functions (functions that are directly implied by the functionalities defined in the container file 40) from indirect functions (functions that are only indirectly implied by the functionalities defined in the container file 40). In such cases, one may advantageously rely on a process as now discussed in reference to FIG. 5. That is, the identification performed step S21 may start with identifying S211 the direct functions. This can simply be achieved by parsing the container file 40. Next, indirect functions can be identified S212-S214 based on the direct functions identified. To that aim, one may for instance simply rely on a lookup table, which aggregates typical dependencies, known from experience gained with previous cases. However, preferred is to identify S212-S214 indirect functions by building S212 an initial image of the container and executing S214 a corresponding container for testing purposes, with a view to identifying residual functions (i.e., does the initial container calls unmapped functions?). Eventually, a final container image is built S212 based on both the direct functions and the indirect functions accordingly identified. In other words, the system may dynamically identify residual functions by testing an initial image of the container. The same procedure can be repeated for each container to be deployed. More generally, the procedures described herein can be applied to every container to be deployed on the system 5.

Typically, the functionalities of a container imply the execution of software libraries. Thus, the system 5 may advantageously include NHCs 20 that are specifically configured to execute such libraries (and, in particular, to accelerate the execution of such libraries), starting with the most commonly used libraries, especially those that are the most work intensive. I.e., the NHCs 20 can be designed to execute such libraries in a more efficient manner than general-purpose hardware 10 of the system 5, hence the benefit of offloading them to the NHCs 20.

As schematically illustrated in FIG. 3, the functionalities of a container can be captured in a container file 40. Such functionalities may notably be defined by a business logic and library dependencies. For example, as exemplified in FIG. 3, a given container file may require the execution of Python libraries such as "OpenCV" and "NumPy", within a given business logic. I.e., the functions identified at step S21 typically depend on both a business logic and software libraries. In such cases, the second subset of functions (i.e., functions relating to such libraries) can be offloaded S14 to respective NHCs 20 by mapping bindings of the corresponding library dependencies onto gates of respective NHCs 20, typically the gates of ASICs and/or FPGAs. This makes it possible to pass the execution of certain libraries most efficiently to respective NHCs 20 at run time, according to the mapping decided earlier. I.e., it is possible to map some functions directly into FPGA or ASIC gates. Doing so is extremely efficient in practice and markedly improves over execution by general-purpose hardware 10.

Figure 6:
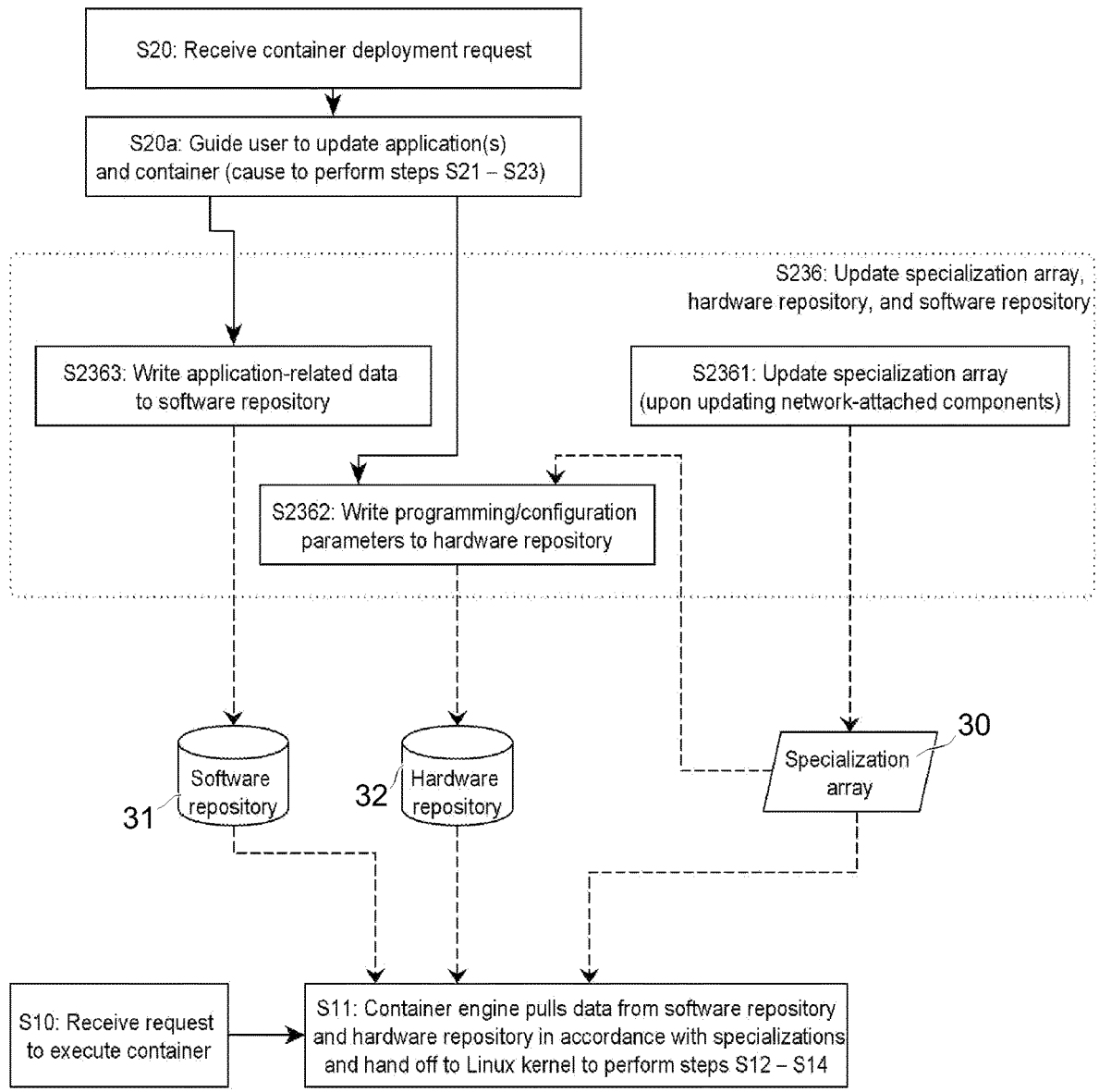
FIG. 6 is a flowchart illustrating how updates to the network-attached components are handled by the system, in embodiments.

Referring to FIG. 6, when the system 5 receives S20 a request to deploy a container 9 from a user 1, the user 1 can advantageously be guided S20a towards the deployment of this container. As a result, steps S21 and S23 can be performed as part of a user-assisted process, with a view to eventually serving the deployment of user containers. Preferred user-guided processes are described in detail in section 2.

The user-guided processes leads the user to write data S2363 to a software repository 31. I.e., software packages that are implemented using software containers are typically stored in a software repository 31, which may include all components and dependencies required to run each particular software package in each software container. Software repositories are known per se. In addition, a further repository 32 (here called a "hardware repository") may advantageously be used to keep track of data required by the NHCs to execute the specialized functions. That is, various NHC-related parameters (e.g., programming and/or configuration parameters of the NHCs) can be written S2362 to the hardware repository 32, in accordance with specializations of the NHCs 20, while application-related data (including dependency data) are written S2363 to the software repository 31. Eventually, the container image is built S26 in accordance with data stored in the hardware repository 32 and the software repository 31. At runtime, the container engine 8 (i.e., the piece of software that runs the containers 9) pulls data from the hardware repository 32 and from the software repository 31 to run the container 9 and the software inside it, as illustrated in FIG. 1B.

In addition to repositories 31, 32, container registries may possibly be involved too. A container registry is a service that stores and distributes container images and related artifacts. Docker Hub is an example of a public container registry, which serves as a general catalog of Docker container images. A container repository is a collection of container images or other artifacts (in a registry), which typically have the same name but different tags. For example, successive versions of a given image can be stored in a same repository. Typically, the container registry is used in the context of a domain name and a service that allows users to pull and push container image data.

Another aspect of the invention is now described in reference to FIGS. 1A and 1B. This other aspect concerns a computerized system 5 for running software inside containers 9. Several features of the system 5 have already been discussed in reference to the present methods. Thus, the system 5 is only briefly described in the following.

Figure 1C:
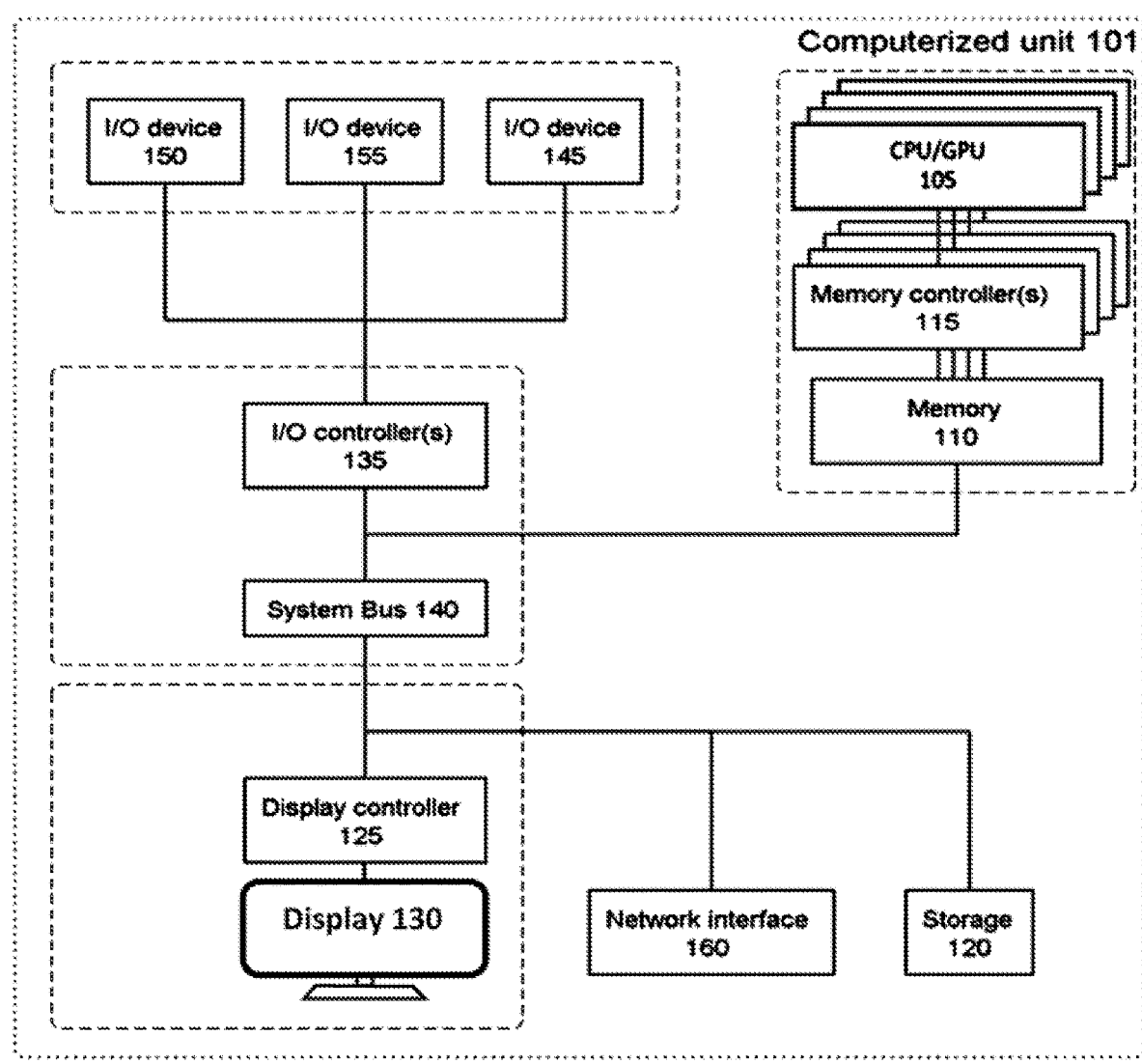
FIG. 1C is a diagram of a general-purpose computerized unit. In embodiments, the general-purpose hardware of the computerized system includes several such units.

The system 5 comprises general-purpose hardware (e.g., CPUs/GPUs 105, memory 110, storage 120, etc.), as well as a composable disaggregated infrastructure 15 equipped with several NHCs 20, as previously discussed. The system 5 may possibly include several servers 6 (each comprising general-purpose hardware), as well several disaggregated structures 15, possibly on different sites. The servers 6 may possibly be delocalized over several computerized entities and may notably include several computerized units 101 such as shown in FIG. 1C.

The system 5 typically executes a system software at one or more entities of the system 5; the execution of this system software results in configuring the system 5 to perform steps as described earlier in reference to the present methods. As a result, and consistently with the present methods, the system 5 is configured to dynamically allocate computerized resources, i.e., general resources enabled by the general-purpose hardware, as well as specialized resources enabled by the NHCs 20. The system 5 is further configured to run software inside each container by executing corresponding functions. In operation, a first subset of the functions are executed using the general resources, whereas a second subset of the functions are executed using the specialized resources, by offloading the second subset of functions to respective NHCs 20, in accordance with the specializations. To that aim, the system 5 maintains a table 30 capturing specializations of the NHCs 20.

As noted earlier, the system 5 may possibly form part of a cloud computing system, contrary to the assumption made in FIG. 1A, where the system is set in data communication with the cloud computing system 3. A preferred scenario in one in which users 1 deploy containers in the system 5 via user devices 2 (i.e., computers) and a cloud 3. In particular, all required network connections might be passed directly through the cloud 3 to the NHCs 20, hence bypassing the server(s) 6.

The NHCs 20 typically include hardware accelerators. The latter are advantageously configured specifically to accelerate the execution of certain libraries, e.g., those libraries that are most frequently required for the execution of user containers and corresponding software, starting with the most work intensive libraries. As noted earlier, bindings of the library dependencies can advantageously be mapped onto gates of the NHCs 20. For example, the hardware accelerators may FPGAs and ASICs. In addition, the accelerators may include field-programmable analog arrays, complex programmable logic devices, data processing units (DPUs), digital signal processors, tensor processing units (TPUs), physics processing units, vision processing units, physical neural networks, secure cryptoprocessors, and systems-on-chip. In addition, the NHCs 20 may include components 20 that are configured as cryptographic accelerators, artificial intelligence accelerators, data compression accelerators, and quantum computing simulation accelerators.

The computerized system 5 may comprise one or more servers 6, where the servers 6 are equipped with the general-purpose hardware 10 that enables the general resources. The general-purpose hardware 10 may notably include or consist of computerized units 101 such as shown in FIG. 1C. Additional aspects of such units 101 are discussed in section 3.

Note, the servers 6 may possibly include accelerators 30 too, albeit non network-attached, as assumed in FIG. 1A. The accelerators 30 may notably include GPUs, TPUs, DPUs, FPGAs, and ASICs. For instance, certain deployment scenarios involve a container using general-purpose hardware 10 and PCIe-attached GPUs 30 at the server 6, as well as network-attached FPGAs 20 at the infrastructure 15.

Next, according to another aspect, the invention can be embodied as a computer program product. The latter may notably embody a system software of a computerized system 5 such as described above, the aim being to be able to run software inside containers 9. The computer program product comprises a computer readable storage medium having program instructions embodied therewith. The program instructions are executable by processing means of the computerized system 5, causing the system software to perform steps according to the present methods. Additional aspects of such computer program products are discussed in section 3.

The above embodiments have been succinctly described in reference to the accompanying drawings and may accommodate a number of variants. Several combinations of the above features may be contemplated. Examples are given in the next section.

Section 2. Particularly preferred embodiments
Section 2.1 Preferred architecture A preferred architecture is shown in FIG. 1A. Users 1 interact with the system 5 via a cloud 3, using their computerized devices 2. The system 5 includes one or more servers 6, as well as one or more composable disaggregated structures 15. Each server 6 relies on general-purpose hardware 10 (see also FIG. 1B), as well as accelerators 30 (albeit not network-attached). Each server 6 runs one or more virtual machines (VMs, or host operating systems) 7, themselves executing one or more container engines 8, in order to execute containers 9. In operation, the container engines pull up data contained in the repositories 31, 32.

Note, the software application container typically includes a base (read-only) image and a writable layer. The base image includes one or more template images, i.e., layers. The writable layer includes a plurality of libraries and user code reflecting a business logic layer. The business logic depends on those libraries. The template images are stored in a public or private software container registry 31. Moreover, a hardware repository 32 (similar to the software repository 31) is used to store all data needed by the NHCs 20, as illustrated in FIG. 1B. Organizations and/or users can create a template image, starting from a base image and adding libraries, files, source code, application executables, etc.

Section 2.2 Preferred flows of operations

FIG. 2 shows a high-level flow of operations according to preferred embodiments. Upon receiving S10 a user command to run a container, the container engine pulls S11 data from the repositories 31, 32 in accordance with specializations needed for software to execute inside this container and then hands off to the Linux kernel. This causes to run S12 the software inside the container 9 and notably results in instructing to dispatch functions required for the execution, using network interfaces and connection means (e.g., pure network sockets). This, in turn, causes to execute S13 a subset of functions via the general-purpose hardware 10 on the server 6, while the executions of specialized functions are offloaded S14 to NHCs 20. Data exchanges required by the executions of the functions are managed S15 by the runtime system, which notably aggregates data returned by the executed functions.

FIG. 4 illustrates how deployment requests can be handled, in embodiments. Upon receiving S20 a container deployment request, the system 5 identifies S21 the required functions (including the specialized and indirect functions), by parsing and analyzing a container file 40 provided by the user. This may prompt the system 5 to update S23 the NHCs 20 (e.g., add and configure new NHCs and/or reconfigure existing NHCs), as well as the specialization array 30, and the repositories 31, 32. Next, the system 5 maps S25 all the identified functions, as needed, i.e., to the server 6 and the NHCs 20, in accordance with the specializations listed in the array 30. Finally, the system 5 builds S26 a container image by pulling data from the repositories 31, 32, in accordance with the mapping done.

In more detail, and as illustrated in FIG. 5, the system 5 identifies S21 the required functions by parsing S210 the container file 40 provided by the user 1. This way, the system 5 first identifies S211 the functions that are directly implied by functionalities defined in the container file 40. Next, an initial container image is built S212 in accordance with the identified functions. A container corresponding to the initial image is then executed at step S214 to check for indirect functions. All the functions identified (including any indirect function) are logged at step S215. The specialization array 30 and the repositories 31, 32 are then updated S23 as follows. For each function identified, the system 5 searches S231 for a corresponding library in the hardware repository 32. If a corresponding library is found (S232: Yes), then the flow goes to step S25, see below. Else (S232: No), the system checks whether it is possible to specialize an NHC 20 at step S233. If so (S233: Yes), an NHC is accordingly configured (or updated) at step S235. This NHC configuration may need refactoring the software involved in the container (i.e., implementing parts or all of the software functionalities in hardware, notably the functionalities that are not already implemented by an NHC). This can be realized by using vendor-specific solutions that implement the corresponding software library, e.g., implementation of some functions of the OpenCV library, either in a hardware description language (HDL), such as VHDL and Verilog, or an electronic netlist. This can also be realized by leveraging high-level-synthesis techniques that enable the automatic refactoring of high-level programming languages, in which those libraries are written, to HDLs, which can, in turn, be to design, e.g., TPUs, DPUs, ASICs, and/or FPGA bitstreams. Else, a software solution is set up S234, based on the software repository 31. The specialization array 30, the hardware repository 32, and the software repository 31 are accordingly updated at step S236, as discussed below in more detail. All functions are suitably mapped S25 to the server 6 and NHCs 20, in accordance with the specialization array 30, prior to building S26 a final container image (i.e., the container image is refactored) by pulling all necessary data from the repositories 31, 32, in accordance with the mapping done.

As shown in FIG. 6, the system 5 may provide an interactive service to guide S20a the user 1 upon receiving S20 a deployment request, with a view to building a suitable container image. Various user-guiding processes can be contemplated, as discussed below. The user-guided process notably causes to perform steps S21-S23 described earlier, which may cause to update S2361 the specialization table 30. In addition, this process causes the user to write S2663 application-related data to the software repository 31, while programming and/or configuration parameters relating to the NHCs 20 are written S2362 to the hardware repository 32. Once the final container image has been obtained (step S26, FIGS. 4, 5), the container engine will, upon receiving a command S10 to execute the container, pull S11 all necessary data from the repositories 31, 32, in accordance with the specializations, and hand off to the Linux kernel to perform steps S11-S14.

A possible user-guided process is the following. A cloud user 1 may want to rely on disaggregated container technology, because s/he expects an acceleration of the execution and/or a cheaper service. A cloud vendor may want to rely on this technology to reduce the image sizes of the containers and decrease the container build time. So, the cloud vendor provides an interactive database, from which the user can select and configure the functions to be accelerated. The user 1 provides a container file 40 (e.g., a Docker file). Based on this input, the interactive database provides a first code snippet to replace the library import in the application, a second code snippet to update the Docker file, as well as a hardware container configuration (e.g., .xml). The user, as application expert, accordingly, updates his/her application and container. Next, the user uploads her/his container and the hardware container configuration to the hardware and software container repositories 31, 32, respectively. Finally, the user deploys her/his container on the container platform and the container platform serves the user's container.

Another user-guided flow is the following. The cloud vendor provides an interactive service to establish the functions that should be accelerated. The user provides a container file 40 (e.g., a Docker file). Based on this input, the interactive service statically profiles the container file to obtain information indicating target libraries required by the container to be deployed. The interactive service asks the user to provide complete inputs for the container, so that a dynamic profiling can be done. The user accordingly provides inputs to the containerized application. Upon completion, the service can dynamically profile an initial version of the container at runtime to obtain information indicating target libraries required by the container to be deployed. The service then locates corresponding bitfiles in the hardware repository 32 and presents an analysis of the libraries found, as well as possible library replacements, to the user 1. The user, as application expert, then decides whether the modified application is still correct. If not, the user can manually correct this. Then, the user confirms the suggested modifications or uploads her/his container and the hardware container configuration to the hardware and software container repositories 31, 32, respectively. Note, the service may optionally modify the container. Finally, the user deploys her/his container on the container platform and the container platform serves the user's container.

Section 3. Technical implementation details
Section 3.1 Computerized units (FIG. 1C)

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly-interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented, wherein virtual machines and/or general-purpose digital computers, such as personal computers, workstations, etc., are used, in addition to NHCs 20 described earlier.

For instance, each of the computerized systems 2, 3, and 5 shown in FIG. 1A may comprise one or more computerized units 101 (e.g., general—or specific-purpose computers), such as shown in FIG. 1C. Each unit 101 may interact with other, typically similar units 101, to perform steps according to the present methods.

In exemplary embodiments, in terms of hardware architecture, as shown in FIG. 1C, each unit 101 includes at least one processor 105, and a memory 110 coupled to a memory controller 115. Several processors (CPUs, and/or GPUs) may possibly be involved in each unit 101. To that aim, each CPU/GPU may be assigned a respective memory controller, as known per se.

One or more input and/or output (I/O) devices 145, 150, 155 (or peripherals) are communicatively coupled via a local input/output controller 135. The I/O controller 135 can be coupled to or include one or more buses and a system bus 140, as known in the art. The I/O controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software, including instructions such as coming as part of computerized tasks triggered by machine learning algorithms. The processors 105 can be any custom made or commercially available processor(s). In general, they may involve any type of semiconductor-based microprocessor (in the form of a microchip or chip set), or more generally any device for executing software instructions, including quantum processing devices.

The memory 110 typically includes volatile memory elements (e.g., random-access memory), and may further include nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 1C, instructions loaded in the memory 110 may include instructions arising from the execution of the computerized methods described herein in accordance with exemplary embodiments. The memory 110 may further load a suitable operating system (OS) 111. The OS 111 essentially controls the execution of other computer programs or instructions and provides scheduling, I/O control, file and data management, memory management, and communication control and related services.

Possibly, a conventional keyboard and mouse can be coupled to the I/O controller 135. Other I/O devices 140-155 may be included. The computerized unit 101 can further include a display controller 125 coupled to a display 130. The computerized unit 101 may also include a network interface or transceiver 160 for coupling to a network (not shown), to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

Section 3.2 Computer program products

The present invention may be a method, and/or a computer program product. The computer program product may include a computer readable storage medium (or media) having computer readable program instructions thereon for causing processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Go, Python, Ruby, Scala, Swift, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Section 3.3 Cloud Computing

It is to be understood that although this disclosure refers to embodiments involving cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant, or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of running software inside one or more containers, the computer-implemented method comprising:
   providing a computerized system with a composable disaggregated infrastructure, wherein the computerized system is configured to dynamically allocate computerized resources, the computerized resources comprising general resources enabled by general-purpose hardware, as well as specialized resources enabled by specialized network-attached hardware components of the composable disaggregated infrastructure;
   maintaining a table capturing specializations of the specialized network-attached hardware components;
   defining functionalities of said each container in a respective container file;
   accessing the respective container file and parsing the respective container file to:
      identify the corresponding functions, as implied by the functionalities defined in the respective container file;
      identify the second subset of functions from the identified functions, according to the specializations captured in the table;
      map the identified functions onto the computerized resources to obtain associations, whereby the second subset of functions are mapped onto said respective components in accordance with respective specializations as captured in the table;
      build an image of said each container according to the associations obtained, whereby the software is subsequently run inside said each container based on the image built;
   for each container of the one or more containers, running software inside said each container by executing corresponding functions, wherein a first subset of the functions are executed using the general resources, and wherein the second subset of the functions are executed using the specialized resources; and
   offloading the second subset of the functions to respective components of the specialized network-attached hardware components based on the specializations of the resources.

2. The computer-implemented method according to claim 1, further comprising:
   updating one or more of the specialized network-attached hardware components to change their specializations; and
   updating the table according to the changed specializations.

3. The computer-implemented method according to claim 2, wherein updating the specialized network-attached hardware components comprises:
   adding one or more new network-attached hardware components to the specialized network-attached hardware components; and
   configuring the new components added so as to specialize the network-attached hardware components in performing specific tasks.

4. The computer-implemented method according to claim 2, wherein the specialized network-attached hardware components are continually updated based on functionalities defined in container files of the containers.

5. The computer-implemented method according to claim 1, wherein identifying the corresponding functions comprises:
   identifying direct functions by parsing the container file, wherein the direct functions being functions that are directly implied by said functionalities; and
   based on the direct functions identified, identifying indirect functions that are indirectly implied by the functionalities defined in the respective container file.

6. The computer-implemented method according to claim 1, wherein identifying the indirect functions comprises building an initial image of said each container and executing a container corresponding to the initial image built and further comprising building a final image of said each container based on both the direct functions and the indirect functions as identified for said each container.

7. The computer-implemented method according to claim 1, wherein the functionalities of said each container imply an execution of one or more libraries; and
one or more of the respective components are specialized in executing the one or more libraries.

8. The computer-implemented method according to claim 1, wherein
the functionalities of said each container are defined by a business logic and library dependencies; and
the identified functions depend on the business logic and the library dependencies.

9. The computer-implemented method according to claim 8, wherein
offloading the second subset of the functions to the respective components comprises mapping bindings of the library dependencies onto gates of at least one of the respective components of the specialized network-attached hardware components.

10. The computer-implemented method according to claim 1, wherein the method further comprises, prior to running software inside said each container:
guiding a respective user towards a deployment of said each container, wherein parameters of said respective components are written to a hardware repository in accordance with said specializations, while application-related data is written to a software repository; and
building an image of said each container in accordance with data stored in the hardware repository and the software repository.

11. The computer-implemented method according to claim 1, wherein the specialized network-attached hardware components include hardware accelerators that are specifically configured to execute respective libraries.

12. The computer-implemented method according to claim 1, wherein
the computerized system comprises one or more servers, the latter configured to provide said general resources;
the computerized system is available via a cloud computing system; and
the second subset of said functions are directly offloaded to respective components of the specialized network-attached hardware components via the cloud computing system, so as to bypass the one or more servers.

13. A computerized system for running software inside one or more containers, wherein:
the system comprises
general-purpose hardware and
a composable disaggregated infrastructure with specialized network-attached hardware components; and
the system is configured to:
dynamically allocate computerized resources, the computer resources comprising general resources enabled by the general-purpose hardware and specialized resources enabled by the specialized network-attached hardware components;
maintain a table capturing specializations of the specialized network-attached hardware components;
define functionalities of said each container in a respective container file;
access the respective container file and parsing the respective container file to:
identify the corresponding functions, as implied by the functionalities defined in the respective container file;
identify the second subset of functions from the identified functions, according to the specializations captured in the table;
map the identified functions onto the computerized resources to obtain associations, whereby the second subset of functions are mapped onto said respective components in accordance with respective specializations as captured in the table;
build an image of said each container according to the associations obtained, whereby the software is subsequently run inside said each container based on the image built;
for each container of the one or more containers, run software inside said each container by executing corresponding functions, whereby, in operation, a first subset of said functions are executed using the general resources, whereas a second subset of said functions are executed using the specialized resources; and
offload the second subset of said functions to respective components of the specialized network-attached hardware components in accordance with the specializations.

14. The computerized system according to claim 13, wherein
the computerized system comprises one or more servers, the one or more servers comprising the general-purpose hardware enabling the general resources.

15. The computerized system according to claim 13, wherein
the specialized network-attached hardware components include hardware accelerators.

16. The computerized system according to claim 15, wherein the hardware accelerators include one or more of field-programmable gate arrays, field-programmable analog arrays, application-specific integrated circuits, complex programmable logic devices, data processing units, digital signal processors, tensor processing units, physics processing units, vision processing units, physical neural networks, secure cryptoprocessors, systems-on-chip, and photonic processing units.

17. The computerized system according to claim 13, wherein the specialized network-attached hardware components include components that are configured as one or more of cryptographic accelerators, artificial intelligence accelerators, data compression accelerators, quantum processing units, and quantum computing simulation accelerators.

18. The computerized system according to claim 13, wherein the specialized network-attached hardware components include components that are specifically configured for execution of respective libraries.

19. A computer program product embodying a system software of a computerized system for running software inside one or more containers, the computer program product comprising a computer readable storage medium having program instructions embodied therewith, the program instructions executable by processing means of the computerized system to cause the system software to:
manage the computerized system, to dynamically allocate computerized resources, the computerized resources comprising general resources enabled by general-purpose hardware of the computerized system and specialized resources enabled by specialized network-attached hardware components of a composable disaggregated infrastructure of the computerized system;
maintain a table capturing specializations of the specialized network-attached hardware components;
define functionalities of said each container in a respective container file;

access the respective container file and parsing the respective container file to:
- identify the corresponding functions, as implied by the functionalities defined in the respective container file;
- identify the second subset of functions from the identified functions, according to the specializations captured in the table;
- map the identified functions onto the computerized resources to obtain associations, whereby the second subset of functions are mapped onto said respective components in accordance with respective specializations as captured in the table;
- build an image of said each container according to the associations obtained, whereby the software is subsequently run inside said each container based on the image built for each container of the one or more containers, run software inside said each container by executing corresponding functions, whereby a first subset of said functions are executed using the general resources, whereas a second subset of said functions are executed using the specialized resources; and offload the second subset of said functions to respective components of the specialized network-attached hardware components in accordance with the specializations.

\* \* \* \* \*